US007948399B2

(12) United States Patent
Tomita et al.

(10) Patent No.: US 7,948,399 B2

(45) Date of Patent: May 24, 2011

(54) PARKING LOT CONGESTED STATE DETERMINATION DEVICE, PARKING LOT CONGESTED STATE DETERMINATION METHOD, AND COMPUTER PROGRAM

(75) Inventors: Hiroshi Tomita, Anjyo (JP); Motohiro Watanabe, Toyohashi (JP)

(73) Assignee: Aisin AW Co., Ltd., Anjo (JP)

( * ) Notice: Subject to any disclaimer, the term of this patent is extended or adjusted under 35 U.S.C. 154(b) by 340 days.

(21) Appl. No.: 12/318,499

(22) Filed: Dec. 30, 2008

(65) Prior Publication Data

US 2009/0207044 A1 Aug. 20, 2009

(30) Foreign Application Priority Data

Feb. 14, 2008 (JP) ................................ 2008-032800

(51) Int. Cl.
*B60Q 1/48* (2006.01)
*B60Q 1/00* (2006.01)
*G01C 21/30* (2006.01)

(52) U.S. Cl. .................. 340/932.2; 340/425.5; 340/990; 701/1; 701/117; 701/209; 701/211

(58) Field of Classification Search ................ 340/932.2
See application file for complete search history.

(56) References Cited

U.S. PATENT DOCUMENTS

| | | | |
|---|---|---|---|
| 6,266,609 B1 | 7/2001 | Fastenrath | |
| 2002/0171562 A1* | 11/2002 | Muraki | 340/932.2 |
| 2005/0021227 A1* | 1/2005 | Matsumoto et al. | 701/207 |
| 2007/0005228 A1 | 1/2007 | Sutardja | |

FOREIGN PATENT DOCUMENTS

| | | |
|---|---|---|
| EP | 1 006 503 A2 | 6/2000 |
| JP | A-2004-177199 | 6/2004 |
| WO | WO 2005/101347 A1 | 10/2005 |

* cited by examiner

*Primary Examiner* — Donnie L Crosland
(74) *Attorney, Agent, or Firm* — Oliff & Berridge, PLC

(57) ABSTRACT

In a case where it is determined that a vehicle is in an unparked state within a parking lot for at least a specified time, the parking lot where the vehicle is currently located is determined to be in a congested state, and information that pertains to the parking lot that is determined to be in a congested state is transmitted to a probe center as probe information. The probe center, based on the received probe information, creates parking lot guidance information to provide guidance on the parking lot that is in a congested state, then distributes the created parking lot guidance information to vehicles that are located in the vicinity of the parking lot that is determined to be in a congested state. A navigation device in a vehicle to which the parking lot guidance information is distributed provides guidance that pertains to the parking lot that is in a congested state.

9 Claims, 8 Drawing Sheets

FIG. 3

PARKING LOT CONGESTION INFORMATION DATA BASE

26

| LAST TRANSMISSION DATE/TIME | FACILITY ID |
|---|---|
| 2008/2/1 9:30 | 100231 |
| 2008/2/1 9:46 | 100265 |
| ... | ... |

PARKING LOT CONGESTED STATE DETERMINATION DEVICE, PARKING LOT CONGESTED STATE DETERMINATION METHOD, AND COMPUTER PROGRAM

The disclosure of Japanese Patent Application No. 2008-032800 filed on Feb. 14, 2008, including the specification, drawings and abstract is incorporated herein by reference in its entirety.

BACKGROUND OF THE INVENTION

1. Field of the Invention

The present invention relates to a parking lot congested state determination device, a parking lot congested state determination method, and a computer program.

2. Description of the Related Art

For some time, it has been possible to use an on-board navigation device, a mobile information device such as a personal digital assistant (PDA), a mobile telephone, or the like, a personal computer, or the like to store map information on roads such as ordinary roads, expressways, and the like, as well as on facility names and the like, in various types of storage devices. It has also been possible to download the map information from a server or the like and to display a map of a desired area for a user.

Furthermore, the known navigation device and the like not only display a map, but also provide guidance to parking lots where a vehicle can park in order to make parking more convenient for the user. In addition, in a case where a parking lot is congested, guidance to that effect is provided before the vehicle arrives at the parking lot. For example, in Japanese Patent Application Publication No. JP-A-2004-177199 (Page 8, FIG. 5), a navigation device is described that determines whether or not a destination parking lot is full by using one of an FM receiver and a beacon receiver to receive information that pertains to whether or not the parking lot is full. In a case where the navigation device determines that the parking lot is full, the device searches for and provides guidance to another parking lot in the vicinity.

SUMMARY OF THE INVENTION

However, the information that is sent to the navigation device that is described in Japanese Patent Application Publication No. JP-A-2004-177199 (Page 8 FIG. 5) and that determines whether or not the parking lot is full is applicable only to a parking lot that is provided with a system that can manage parking in each of the parking spaces that are formed within the parking lot and can control the number of vehicles that enter and the number of vehicles that leave the parking lot with respect to the number of vehicles that can be accommodated. That is, the navigation device can determine whether or not a large-scale parking lot that is equipped with sensors and infrastructure is full, but it cannot determine whether a small-to-medium-scale parking lot without those features is full or not.

The present invention addresses the known problems and provides a parking lot congested state determination device, a parking lot congested state determination method, and a computer program that can determine a congested state of a small-to-medium-scale parking lot that is not equipped with sensors and infrastructure, and that can utilize the results of the congested state determination to guide the user appropriately to a parking lot that can currently be used.

The parking lot congested state determination device that has the configuration described in a first aspect makes it possible to determine the congested state even for a small-to-medium-scale parking lot that is not equipped with sensors and infrastructure. Using the result of the congested state determination makes it possible to guide the user appropriately to a parking lot that can currently be used.

The parking lot congested state determination device according to the second aspect determines that the parking lot is in a congested state in a case where the vehicle remains within the parking lot for at least a specified time with the ignition switch in the on state. This makes it possible to detect the vehicle as staying within the parking lot because it is waiting to park and to determine the congested state of the parking lot accurately.

The parking lot congested state determination device according to a third aspect determines that the parking lot is in a congested state in a case where the vehicle remains in an aisle within the parking lot for at least a specified time. This makes it possible to detect the vehicle as remaining in the aisle for a long time because it is waiting to park and to determine the congested state of the parking lot accurately.

The parking lot congested state determination device according to a fourth aspect varies the standards for the determination of the congested state based on the form of the parking lot. This makes it possible for the scale and the structure of the parking lot to be taken into account, so the congested state can be determined accurately for each parking lot.

The parking lot congested state determination device according to a fifth aspect determines that the parking lot is in a congested state in a case where the vehicle passes through the same location within the parking lot a plurality of times. This makes it possible to detect the vehicle as driving through the aisles because it is waiting to park and to determine the congested state of the parking lot accurately.

The parking lot congested state determination device according to a sixth aspect makes it possible to transmit to the center, as the probe information, the information on the parking lot that is determined to be in a congested state and to provide the information to other vehicles that are searching for parking lots. The other vehicles can therefore avoid the congested parking lot based on the information that is provided, thus making parking more convenient for the other vehicles.

The parking lot congested state determination method according to a seventh aspect makes it possible to determine the congested state even for a small-to-medium-scale parking lot that is not equipped with sensors and infrastructure. Using the result of the congested state determination makes it possible to guide the user appropriately to a parking lot that can currently be used.

The computer program according to an eighth aspect makes it possible for the computer to determine the congested state even for a small-to-medium-scale parking lot that is not equipped with sensors and infrastructure. Using the result of the congested state determination makes it possible to guide the user appropriately to a parking lot that can currently be used.

BRIEF DESCRIPTION OF THE DRAWINGS

FIG. 3 is a figure that shows an example of a storage area in a parking lot congestion information data base 26;

DETAILED DESCRIPTION OF THE PREFERRED EMBODIMENTS

A parking lot congested state determination device according to the present invention will be explained in detail below with reference to the drawings, based on an embodiment that is implemented in a navigation device.

Figure 1:
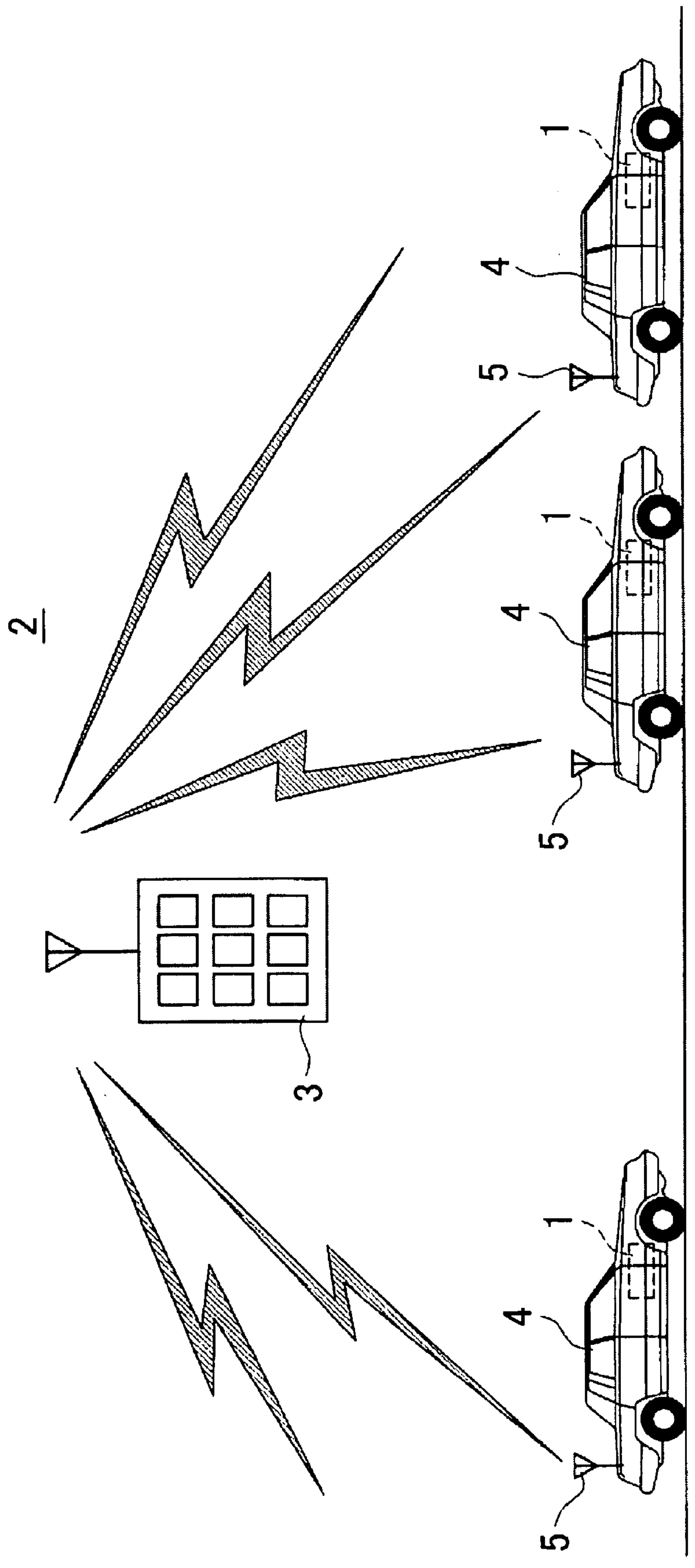
FIG. 1 is a schematic configuration diagram that shows a parking lot information provision system according to an embodiment.

First, an overall configuration of a parking lot information provision system 2 that includes a navigation device 1 according to the present embodiment will be explained using FIG. 1. FIG. 1 is a schematic configuration diagram that shows the parking lot information provision system 2 according to the present embodiment.

As shown in FIG. 1, the parking lot information provision system 2 according to the present embodiment is basically configured from a probe center 3 and vehicles 4. The probe center 3 collects probe data and creates and distributes traffic information that is based on the collected probe information. The vehicles 4 are probe cars.

The probe center 3 collects and amasses the probe information that is transmitted from the vehicles 4, which drive through every region of the entire country, and that includes the driving paths, the driving speeds, and the like of the vehicles 4. The probe center 3 is also a traffic information distribution center that creates the traffic information, such as congestion information and the like, by performing statistical processing on the amassed probe information and distributes the created traffic information (hereinafter called the "probe statistical traffic information") to the vehicles 4. Further, in the parking lot information provision system 2, information that pertains to levels of congestion at parking lots is specifically collected as the probe information and distributed to the vehicles 4.

The vehicles 4 are vehicles that drive every road in the entire country, and as probe cars, they form a probe car system together with the probe center 3. The probe car system is a system that collects information using the vehicles 4 as sensors. Specifically, the probe car system is a system in which a vehicle communication module 5 (hereinafter simply called the "communication module 5"), which is a mobile telephone, a DCM, or the like, is installed in each of the vehicles 4 in advance. Through the communication module 5, each of the vehicles 4 transmits the operating statuses of various systems to the probe center 3, such as data on the vehicle speed, steering operations, shift positions, and the like, in addition to the GPS position information. At the probe center 3, the collected data is reused as various types of information.

In addition, the navigation device 1 is installed in each of the vehicles 4. The navigation device 1 is an on-board device that displays a map of the area around the current position of the vehicle, based on map information that it has in storage, and uses the probe statistical traffic information that is received from the probe center 3 to search for and provide guidance on a route to a set destination. The navigation device 1 also provides guidance to the user concerning the probe statistical traffic information that is received from the probe center 3 and the levels of congestion at parking lots.

Figure 2:
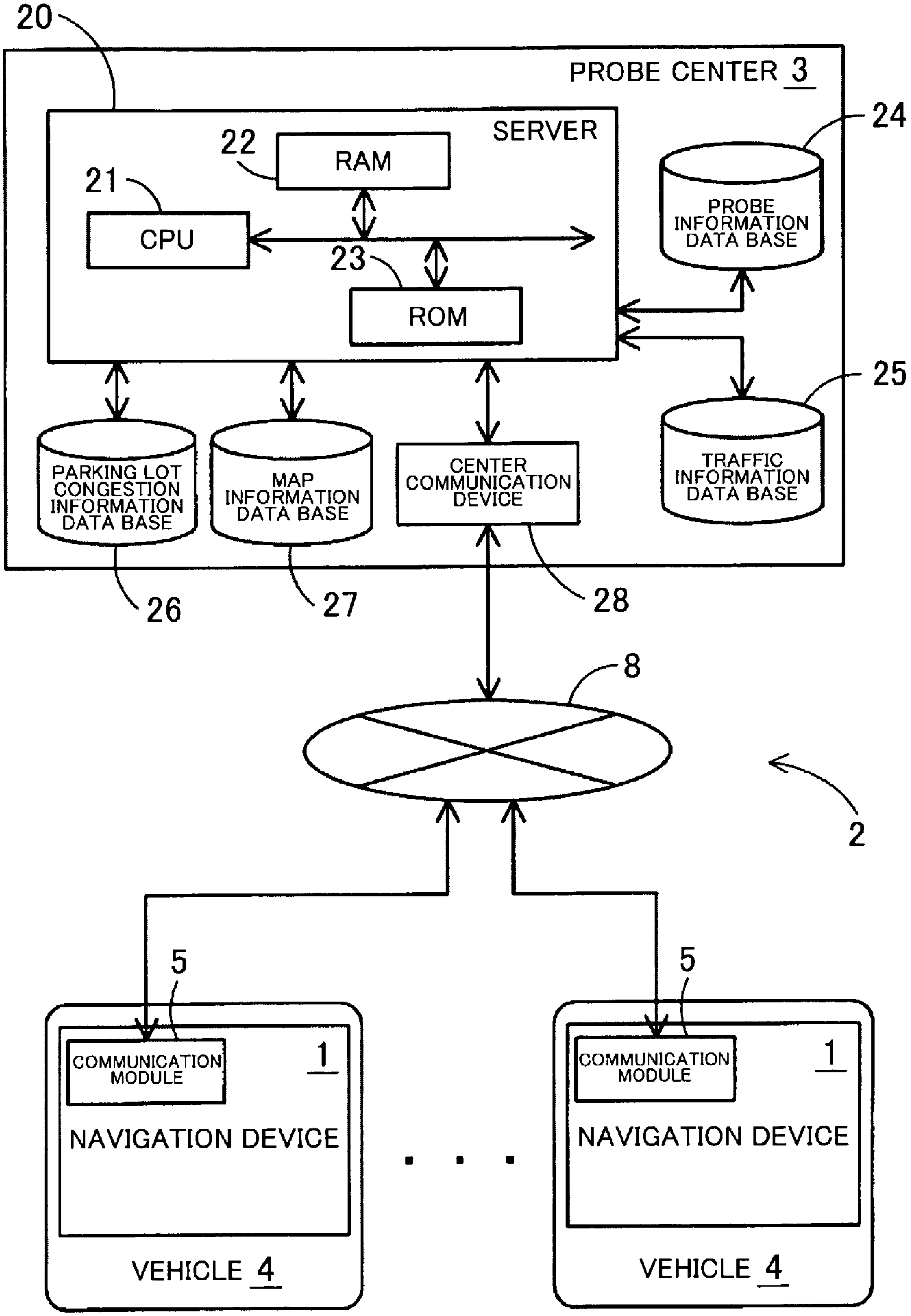
FIG. 2 is a block diagram that shows a configuration of the parking lot information provision system according to the embodiment.

Next, the configuration of the probe center 3 that is a constituting element of the parking lot information provision system 2 will be explained in greater detail using FIG. 2. FIG. 2 is a block diagram that shows the configuration of the parking lot information provision system 2 according to the present embodiment.

As shown in FIG. 2, the probe center 3 includes a server 20, as well as a probe information data base 24, a traffic information data base 25, a parking lot congestion information data base 26, and a map information data base 27 that serve as information storage units that are connected to the server 20, as well as a center communication device 28.

The server 20 includes a CPU 21, as well as internal storage devices such as a RAM 22, a ROM 23, and the like. The CPU 21 serves as a computation device and a control device that performs overall control of the server 20. The RAM 22 is used as a working memory in the execution of the various types of computational processing that are performed by the CPU 21. The RAM 22 also stores various types of control programs for performing traffic information creation processing, parking lot congestion determination processing (FIG. 5), parking lot guidance processing (FIG. 6), and the like. The traffic information creation processing creates various types of traffic information by performing statistical processing of the probe information that is collected by the vehicles 4. The parking lot congestion determination processing updates information that pertains to the current levels of congestion in the parking lots (hereinafter called the "parking lot congestion information"), similarly based on the probe information that is collected by the vehicles 4. The parking lot guidance processing distributes the created traffic information and the parking lot congestion information to the vehicles 4. The ROM 23 stores programs that are used to control the various types of devices that are included in the probe center 3.

The probe information data base 24 is a storage unit that accumulates and stores the probe information that is collected by each of the vehicles 4 that drive around the entire country. Note that in the present embodiment, the probe information that is collected by the vehicles 4 specifically includes information that pertains to the levels of congestion at parking lots.

The traffic information data base 25 is a storage unit that stores the probe statistical traffic information that is created by the server 20 based on the statistical processing of the probe information that is stored in the probe information data base 24. The information that is contained in the probe statistical traffic information includes directions of travel on links, link travel times, average vehicle speeds, levels of congestion on links, and the like.

The parking lot congestion information data base 26 is a storage unit that stores the parking lot congestion information that is created and updated by the server 20 based on the probe information that is stored in the probe information data base 24, particularly the information that pertains to the levels of congestion at parking lots. The information that is contained in the parking lot congestion information includes, for example, information that pertains to parking lots that have been determined to be currently in a congested state.

For example, FIG. 3 is a figure that shows an example of a storage area in the parking lot congestion information data base 26. The information that pertains to parking lots that have been determined to be in a congested state by the navigation devices 1 that are provided in the vehicles 4 that drive through every region of the entire country, as described later, is accumulated and stored in the parking lot congestion information data base 26.

Specifically, as shown in FIG. 3, a last transmission date/time and a facility ID are stored in the parking lot congestion information data base 26. The last transmission date/time indicates when the probe information that the parking lot was determined to be in a congested state was last transmitted to the probe center 3. The facility ID specifies the parking lot that was determined to be in a congested state. As described later, the server 20, based on the parking lot congestion information that is stored in the parking lot congestion information data base 26, transmits, to a vehicle that is located in the vicinity of a parking lot that has been determined to be in a congested state, information that provides guidance to the effect that the parking lot is congested.

Further, when a set period of time (for example, thirty minutes) has passed after the time when the probe information that specifies that the parking lot is in a congested state was last transmitted from the vehicle 4 (that is, the last transmission date/time), the information that pertains to that parking lot is deleted from the parking lot congestion information data base 26. This makes it possible for the server 20 always to have the most recent information on the levels of congestion at parking lots in every region of the entire country.

The map information data base 27 is a storage unit that stores, for example, link data that pertains to roads (links), node data that pertains to node points, map display data for displaying maps, intersection data that pertains to intersections, search data for searching for a route, facilities data that pertains to facilities such as parking lots, event venues, and the like, search data for searching for a location, and the like.

The center communication device 28 is a communication device for communicating with the vehicles 4 through a network 8.

Figure 4:
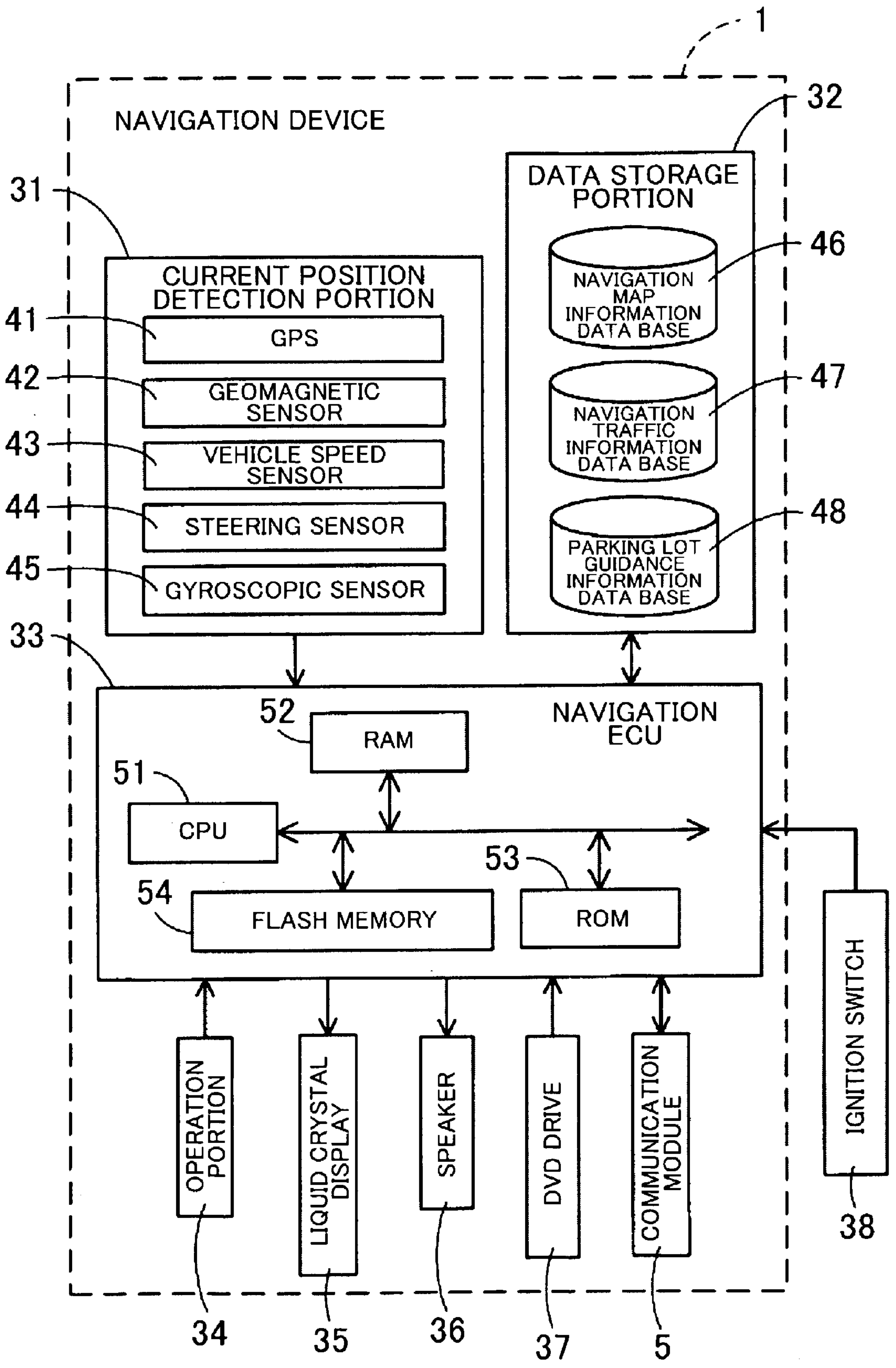
FIG. 4 is a block diagram that shows a configuration of a navigation device according to the embodiment.

Next, an overall configuration of the navigation device 1 that is installed in each of the vehicles 4 will be explained using FIG. 4. FIG. 4 is a block diagram that shows the navigation device 1 according to the present embodiment.

As shown in FIG. 4, the navigation device 1 according to the present embodiment is configured from a current position detection portion 31, a data storage portion 32, a navigation ECU 33, an operation portion 34, a liquid crystal display 35, a speaker 36, a DVD drive 37, and a communication module 5. The current position detection portion 31 detects the current position of the vehicle. The data storage portion 32 stores various types of data. The navigation ECU 33 performs various types of computational processing based on information that is input. The operation portion 34 accepts an operation from an operator. The liquid crystal display 35 displays information for the operator, such as a map, a parking lot that can be used, and the like. The speaker 36 outputs voice guidance that pertains to route guidance. The DVD drive 37 reads a DVD that is a storage medium that stores a program. The communication module 5 performs communication with an information center such as the probe center 3, a VICS center, or the like. An ignition switch 38 is also connected to the navigation ECU 33 so that the navigation ECU 33 can detect an ignition operation of the vehicle (the ignition being turned one of on and off).

The individual configuring elements of the navigation device 1 will be explained below. The current position detection portion 31 includes a GPS 41, a geomagnetic sensor 42, a vehicle speed sensor 43, a steering sensor 44, a gyroscopic sensor 45 that serves as a heading detection portion, an altimeter (not shown in the drawing), and the like. The current position detection portion 31 is thus capable of detecting the vehicle's current position, heading, running speed, and the like. The vehicle speed sensor 43, in particular, is a sensor for detecting the vehicle speed and the distance that the vehicle travels. The vehicle speed sensor 43 generates pulses according to the revolutions of the vehicle's wheels and outputs pulse signals to the navigation ECU 33. The navigation ECU 33 computes the revolution speed of the wheels and the distance traveled by counting the generated pulses. Note that it is not necessary for the navigation device 1 to be provided with all of the five types of sensors described above. The navigation device 1 may also be configured such that it is provided with at least one type of sensor and less than five types of sensors.

The data storage portion 32 is provided with a hard disk (not shown in the drawing) that serves as an external storage device and a storage medium, a navigation map information data base 46, a navigation traffic information data base 47, and a parking lot guidance information data base 48 that are stored on the hard disk, and a recording head (not shown in the drawing) that serves as a driver for reading out a specified program and the like and also writing specified data to the hard disk.

The navigation map information data base 46 is a storage unit that basically has the same configuration as the map information data base 27 in the probe center 3. For example, the navigation map information data base 46 stores link data that pertains to roads (links), node data that pertains to node points, map display data for displaying maps, intersection data that pertains to intersections, search data for searching for a route, facilities data that pertains to facilities such as parking lots, event venues, and the like, search data for searching for a location, and the like.

In particular, the facilities data for a parking lot includes information that pertains to location coordinates, use conditions, and the like, as well as information on the form of the parking lot (the surface area of the parking lot, the number of vehicles that can be accommodated in the parking lot, information on the demarcation of parking areas and aisles in the parking lot, and the total number of levels in a multi-level parking lot).

The navigation traffic information data base 47 is a storage unit that stores the probe statistical traffic information that is distributed from the probe center 3 and VICS information that is distributed from a VICS center. The navigation ECU 33 uses the traffic information that is stored in the navigation traffic information data base 47 in performing route searches and providing traffic information.

The parking lot guidance information data base 48 is a storage unit that stores parking lot guidance information (that is, information that pertains to the parking lots that are currently in a congested state) that is distributed from the probe center 3. In a case where it is determined that a destination parking lot is in a congested state, the navigation ECU 33 uses the parking lot guidance information that is stored in the parking lot guidance information data base 48 to provide guidance to that effect. The navigation ECU 33 may also provide guidance to another parking lot that can be currently used.

The navigation ECU 33 (a vehicle information acquisition unit, an unparked state determination unit, a congestion determination unit, a parking lot form acquisition unit, a time setting unit, and a probe information transmission unit) is an electronic control unit that performs overall control of the navigation device 1, including guidance route setting processing, parking lot congestion determination processing, parking lot guidance processing, and the like. In a case where a destination has been selected, the guidance route setting processing sets a guidance route from the current position to the destination. The parking lot congestion determination processing determines the level of congestion at a parking lot. The parking lot guidance processing provides parking lot guidance based on the parking lot guidance information that is distributed from the probe center 3. The navigation ECU 33 includes a CPU 51, as well as internal storage devices such as a RAM 52, a ROM 53, a flash memory 54, and the like. The CPU 51 serves as a computational device and a control device. The RAM 52 is used as a working memory in the execution of the various types of computational processing that are performed by the CPU 51. The RAM 52 also stores route data and the like when a route has been found. The ROM 53 stores programs that are used for control of the various types of devices that are provided in the navigation device 1. The flash memory 54 stores programs that are read out from the ROM 53 and also stores a parking lot congestion determination processing program (refer to FIG. 5), a parking lot guidance processing program (refer to FIG. 6), and the like that will be described later.

The operation portion 34 is configured from a plurality of switches (not shown in the drawing), such as various types of keys, buttons, and the like, and is operated, for example, when a destination is input as a guidance end point. Based on switch signals that are output when the various switches are pressed or the like, the navigation ECU 33 performs control such that various types of corresponding operations are executed. Note that the operation portion 34 can also be configured from a touch panel that is provided on the front face of the liquid crystal display 35. The operation portion 34 is also sometimes used to input a departure point as a guidance start point.

The liquid crystal display 35 is provided on one of the center console and the instrument panel in the vehicle cabin and displays map images that include roads, traffic information, operation guidance, operation menus, key guidance, a guidance route from the current position to the destination, guidance information along the guidance route, news, weather forecasts, time information, e-mail, television programs, and the like. In a case where the vehicle is located in the vicinity of the destination and it is determined that a parking lot for the destination is in a congested state, the liquid crystal display 35 provides guidance to that effect. The liquid crystal display 35 also displays guidance to a parking lot in the vicinity of the destination that has been determined not to be in a congested state and is thus a parking lot that can be used.

The speaker 36, based on commands from the navigation ECU 33, outputs voice guidance that guides driving along the guidance route, as well as guidance on traffic information.

The communication module 5 is a communication module such as a mobile telephone, a DCM, or the like for use in a vehicle. In addition to transmitting the probe data to the probe center 3 through a mobile telephone communication network, the communication module 5 receives various types of information that are transmitted from the probe center 3, such as parking lot guidance information, traffic information, and the like.

Figure 5:
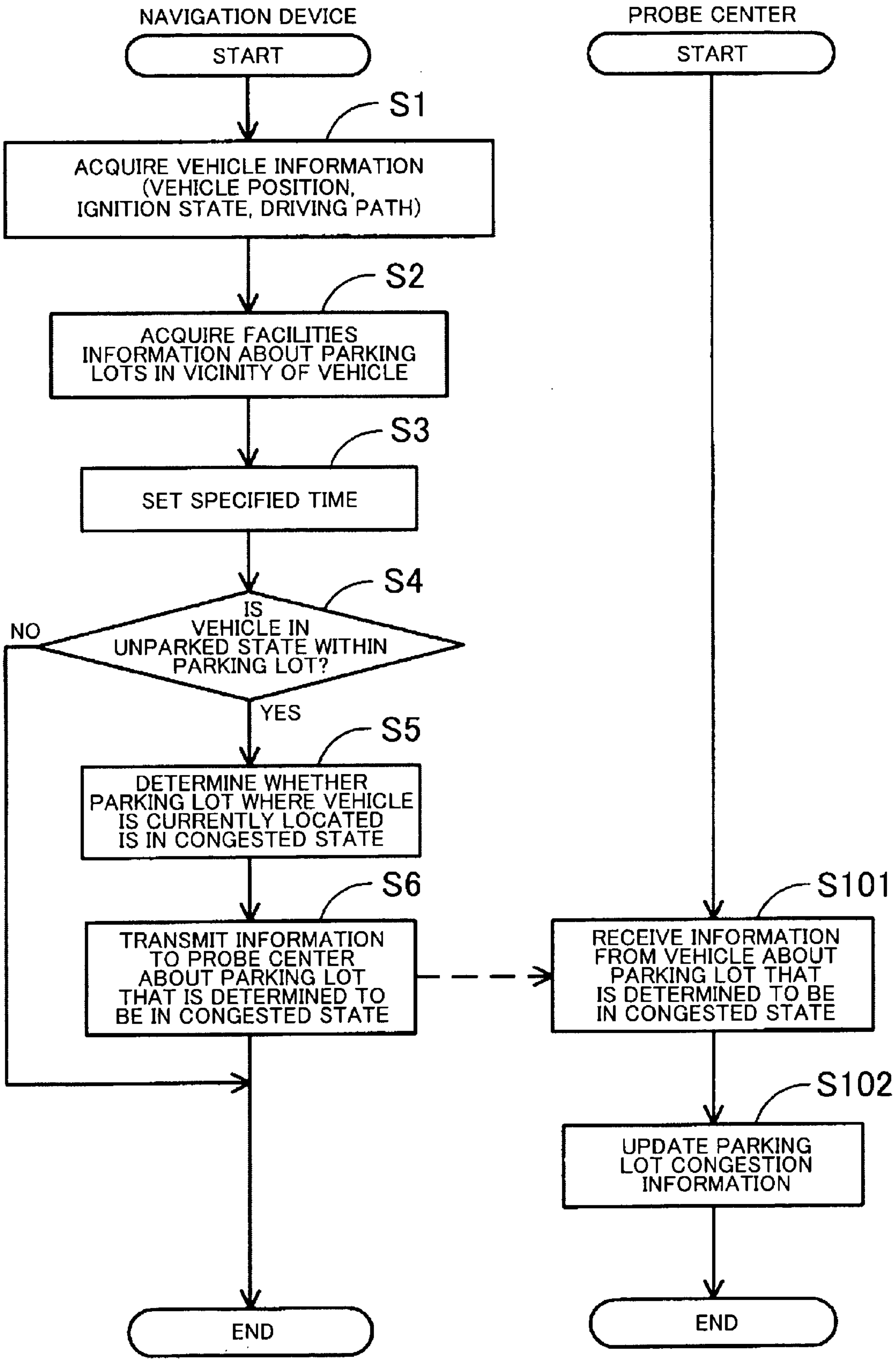
FIG. 5 is a flowchart of a parking lot congestion determination processing program according to the embodiment.

Next, the parking lot congestion determination processing program will be explained based on FIG. 5. The parking lot congestion determination processing program is executed in the navigation device 1 and the probe center 3 that are configuring elements of the parking lot information provision system 2 that has the configuration described earlier. FIG. 5 is a flowchart of the parking lot congestion determination processing program according to the present embodiment. The parking lot congestion determination processing program is a program that is executed at fixed intervals (for example, 200 milliseconds). It determines the level of congestion in the parking lot where the vehicle is located, then transmits the level of congestion to the probe center 3. Note that the program that is shown in the flowchart in FIG. 5 is stored in the RAM, the ROM, or the like that are provided in the navigation ECU 33 and the server 20 and is executed by the CPU 51 and the CPU 21.

First, the parking lot congestion determination processing program that is executed by the navigation device 1 will be explained. At step (hereinafter abbreviated as "S") 1, the CPU 51 acquires vehicle information about the vehicle, based on the detection results from the various sensors 41 to 45. The vehicle information that is acquired at S1 includes (a) the current position of the vehicle that is detected by the GPS 41, (b) the state of the ignition switch (one of on and off), and (c) the driving path of the vehicle within the parking lot within a specified time (for example, fifteen minutes). With regard to the current position of the vehicle that is included in the vehicle information, note that the CPU 51 performs map matching processing based on the map information that is stored in the navigation map information data base 46 and specifies the current position of the vehicle on a map. Further, S1 is equivalent to processing by a vehicle information acquisition unit.

Next, at S2, the CPU 51 acquires facilities information that pertains to parking lots in the vicinity of the vehicle from the navigation map information data base 46. Specifically, the CPU 51 acquires (a) facility IDs, (b) location coordinates for the parking lots, (c) the surface areas of the parking lots, (d) information on the demarcation of parking areas and aisles in the parking lot, and (e) in the case of a multi-level parking lot, the total number of levels. Note that S2 is equivalent to processing by a parking lot form acquisition unit.

Next, at S3, the CPU 51 sets a specified time based on the facilities information that was acquired at S2. The specified time will become a standard for the determination of conditions (1) and (2) at S4, described below. Note that the processing at S3 will be described in detail later.

Next, at S4, the CPU 51 determines whether or not the vehicle is in an unparked state within the parking lot, based on the vehicle information that was acquired at S1 and the facilities information that was acquired at S2. Note that the unparked state is a state in which parking has not been completed, even though the vehicle is located in a parking lot. The navigation device 1 according to the present embodiment determines that the vehicle is in an unparked state within the parking lot if any one of the conditions (1) to (3) below is fulfilled.

(1) With the ignition switch in the on state, the vehicle has remained within the parking lot for at least the specified time.

(2) The vehicle has remained in the aisles within the parking lot for at least the specified time.

(3) After entering the parking lot, the vehicle passes through the same location within the parking lot a plurality of times before the ignition switch is turned off.

In other words, if condition (1) is fulfilled, the CPU 51 detects that the vehicle is in a state of staying within the parking lot because it is waiting to park. If condition (2) is fulfilled, the CPU 51 detects a state in which the vehicle remains in the aisles for a long time because it is waiting to park. If condition (3) is fulfilled, the CPU 51 detects a state in which the vehicle is driving through the aisles because it is waiting to park.

The specified time that serves as the standard for the determination of conditions (1) and (2) at S4 is set based on the facilities information that was acquired at S2, particularly on the form of the parking lot. Specifically, the specified time is set to a longer time, for example, as the surface area of the parking lot becomes greater (not greater than 100 square meters: 5 minutes, 100 to 500 square meters: 10 minutes, not less than 500 square meters: 20 minutes). In a case where the parking lot in which the vehicle is located is a multi-level parking lot, the specified time is set to a longer time as the total number of levels becomes greater (2 levels: 15 minutes, 3 levels: 20 minutes, 4 or more levels: 30 minutes). This makes it possible to determine accurately whether or not the vehicle is in a state of waiting to park, based on the form of the parking lot. Note that S3 is equivalent to processing by a time setting unit, and S4 is equivalent to processing by an unparked state determination unit.

In a case where it is determined at S4 that the vehicle is in an unparked state for at least the specified time (YES at S4), the CPU 51 determines whether the parking lot where the vehicle is located is in a congested state and whether the vehicle is currently in a state of waiting to park (S5). Note that S5 is equivalent to processing by a congestion determination unit.

Next, at S6, the CPU 51 transmits to the probe center 3, as the probe data, information that pertains to the parking lot that was determined to be in a congested state at S5 (specifically, the facility ID that specifies the parking lot). As described later, the probe center 3, based on the probe information that is transmitted from the vehicle, performs processing that updates the parking lot congestion information that pertains to the current level of congestion in the parking lot. Note that S6 is equivalent to processing by a probe information transmission unit.

Figure 7:
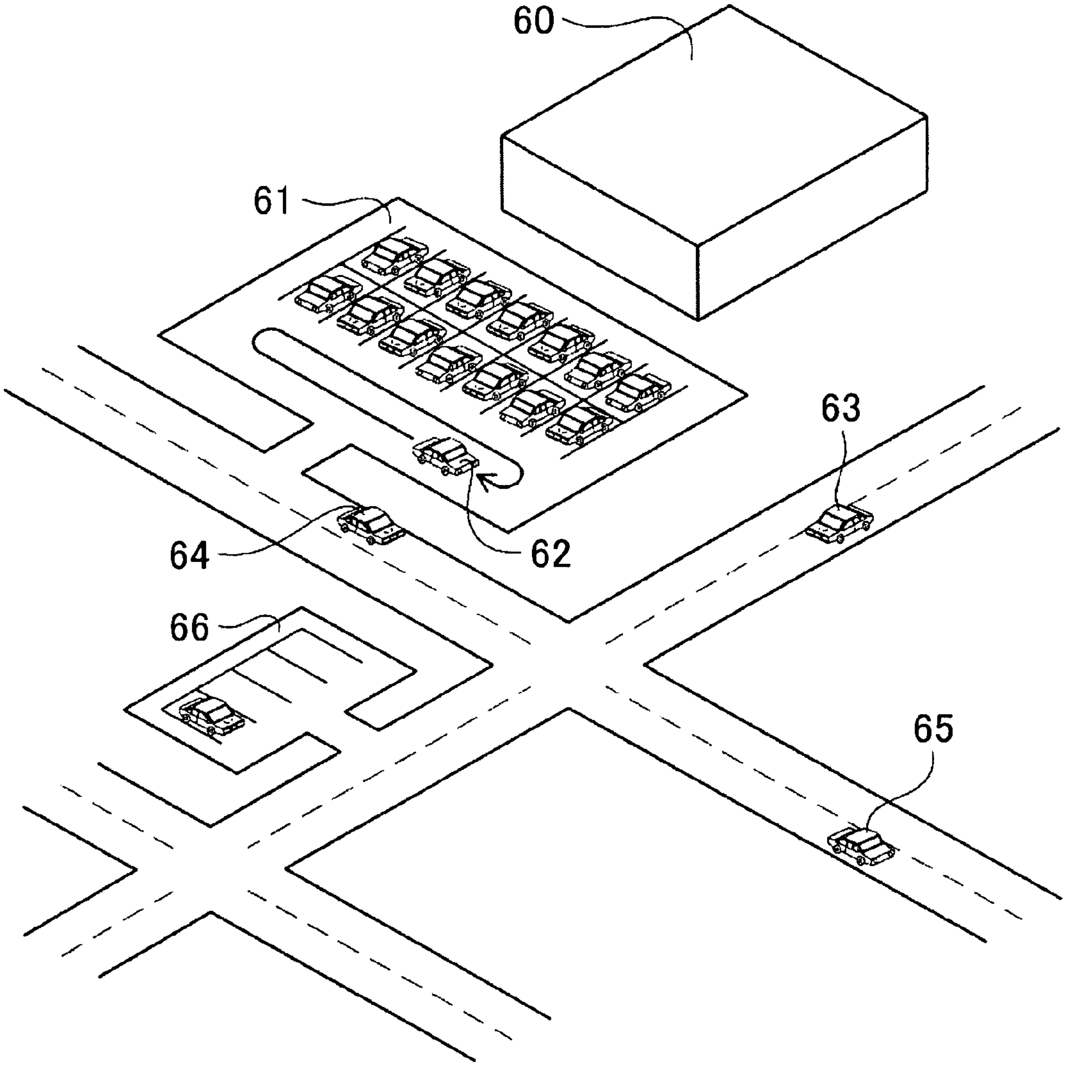
FIG. 7 is an aerial view that shows a parking lot that has been determined to be in a congested state and the situation on surrounding roads.

Next, the processing from S4 to S6 will be explained in greater detail using a specific example. FIG. 7 is an aerial view that shows a facility 60, a parking lot 61 that is provided at the facility 60, and the situation on surrounding roads.

As shown in FIG. 7, the parking lot 61 is full. In a case where a vehicle 62 has been in the aisles within the parking lot 61 for at least the specified time, a navigation device that is installed in the vehicle 62 determines that parking lot 61 is in a congested state. The navigation device transmits to the probe center 3 information that pertains to the parking lot 61, which has been determined to be in a congested state.

On the other hand, in a case where it is determined at S4 that the vehicle is not in an unparked state for at least the specified time (NO at S4), the parking lot congestion determination processing program is terminated.

Next, the parking lot congestion determination processing program that is executed by the probe center 3 will be explained. First, at S101, the CPU 21 receives the information that was transmitted from the vehicle 4 at S6 and that pertains to the parking lot that was determined to be in a congested state.

Next, at S102, the CPU 21 updates the parking lot congestion information that is stored in the parking lot congestion information data base 26, based on the information that was received at S101 and that pertains to the parking lot that was determined to be in a congested state. Note that the parking lot congestion information, as has already been explained using FIG. 3, includes the last transmission date/time and the facility ID. The last transmission date/time indicates when the probe information that the parking lot was determined to be in a congested state was last transmitted from the vehicle 4. The facility ID specifies the parking lot that was determined to be in a congested state. Both the last transmission date/time and the facility ID are stored in the parking lot congestion information data base 26.

In the processing at S102, in a case where the facility ID that is transmitted from the vehicle 4 is a facility ID that is already stored in the parking lot congestion information data base 26, only the last transmission date/time that is associated with that facility ID is updated to the current date/time. In contrast, in a case where the facility ID that is transmitted from the vehicle 4 is a facility ID that is not stored in the parking lot congestion information data base 26, the facility ID and the current date/time are respectively stored as a new facility ID and a new last transmission date/time in the parking lot congestion information data base 26.

The parking lot congestion determination processing program is then terminated.

Figure 6:
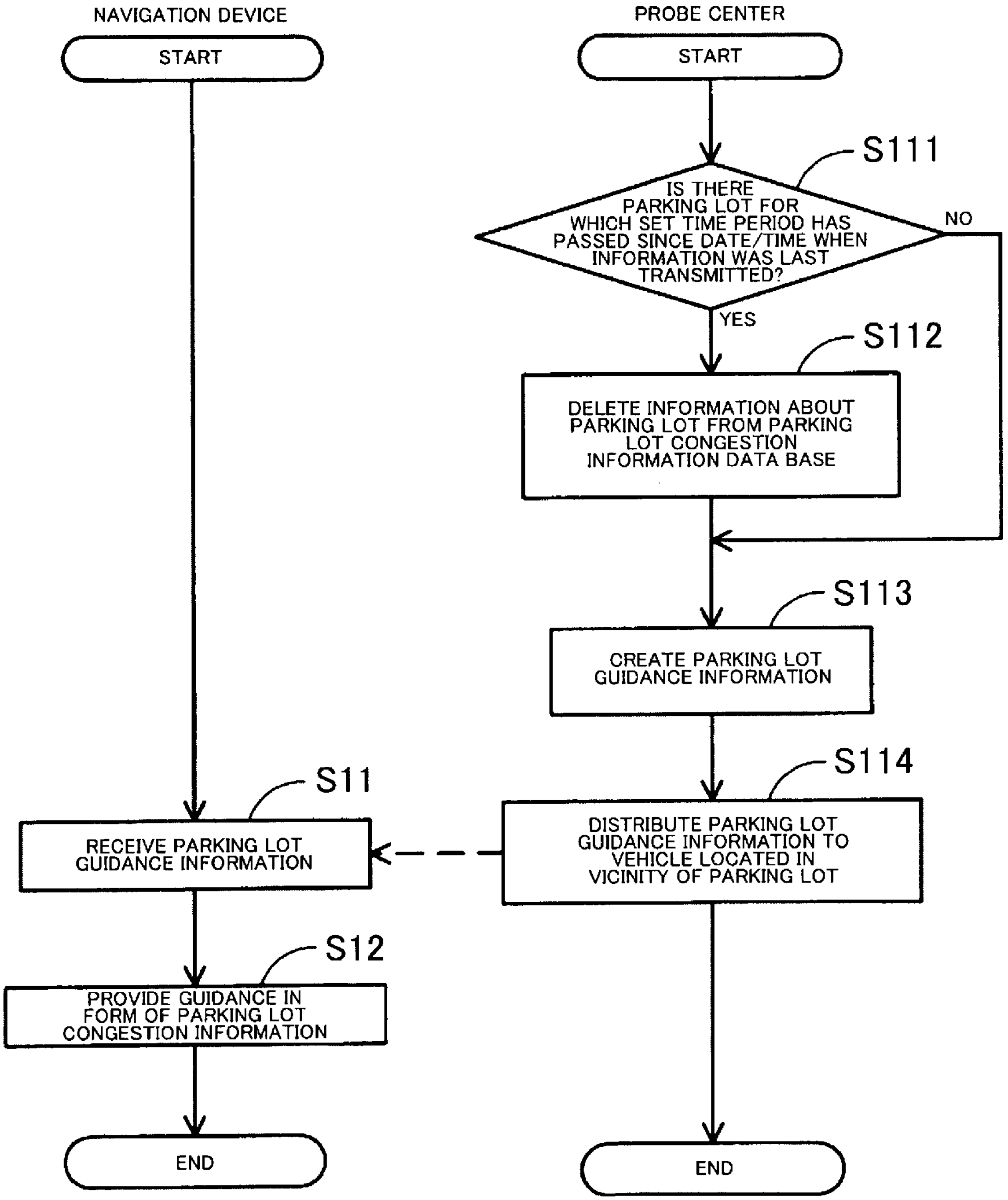
FIG. 6 is a flowchart of a parking lot guidance processing program according to the embodiment.

Next, the parking lot guidance processing program will be explained based on FIG. 6. The parking lot guidance processing program is executed in the navigation device 1 and the probe center 3 that are configuring elements of the parking lot information provision system 2 that has the configuration described earlier. FIG. 6 is a flowchart of the parking lot guidance processing program according to the present embodiment. The parking lot guidance processing program is a program that is executed at fixed intervals (for example, 200 milliseconds). When the vehicle is located in the vicinity of a parking lot that has been determined to be in a congested state by the parking lot congestion determination processing program (FIG. 5), the parking lot guidance processing program provides guidance to that effect to the vehicle. Note that the program that is shown in the flowchart in FIG. 6 is stored in the RAM, the ROM, or the like that are provided in the navigation ECU 33 and the server 20 and is executed by the CPU 51 and the CPU 21.

First, the parking lot guidance processing program that is executed by the probe center 3 will be explained. At S111, the CPU 21 refers to the parking lot congestion information data base 26 and determines whether or not there is any parking lot congestion information in the data base for a parking lot for which at least a set period of time (for example, thirty minutes) has elapsed since the last transmission date/time. That is, the CPU 21 determines whether or not there is a parking lot for which the set period of time has elapsed since the time when the probe information that specifies that the parking lot is in a congested state was last transmitted from the vehicle 4.

In a case where it is determined that there is a parking lot for which the set period of time has elapsed since the time when the probe information that specifies that the parking lot is in a congested state was last transmitted from the vehicle 4 (YES at S111), the CPU 21 deletes from the parking lot congestion information data base 26 the parking lot congestion information that pertains to that parking lot (S112). In contrast, in a case where it is determined that there is no parking lot for which the set period of time has elapsed since the time when the probe information that specifies that the parking lot is in a congested state was last transmitted from the vehicle 4 (NO at S111), the processing proceeds to S113.

At S113, based on the parking lot congestion information that is stored in the parking lot congestion information data base 26, the CPU 21 creates the parking lot guidance information to provide guidance on the parking lots that are currently in a congested state to each of the vehicles 4 that are driving around the entire country. The information that is contained in the parking lot guidance information includes the facility IDs, the location coordinates, and the like that specify the parking lots that are in a congested state.

Next, at S114, the CPU 21 distributes the parking lot guidance information that was created at S113 to those of the vehicles 4 that are driving around the entire country that are located in the vicinity of a parking lot that has been determined to be in a congested state (for example, within the same map grid square as the parking lot, or in an adjacent grid square). Note that the navigation devices 1 that are provided in the vehicles 4 to which the parking lot guidance information is distributed, as described below, are capable of performing the parking lot guidance based on the distributed parking lot guidance information.

Next, the parking lot guidance processing program that is executed by the navigation device 1 will be explained. First, at S11, the CPU 51 receives the parking lot guidance information that was distributed from the probe center 3 at S114.

Next, at S12, based on the parking lot guidance information that was received at S11, the CPU 51 provides guidance in the form of congestion information for the parking lot. Specifically, in a case where the destination parking lot is in a congested state, the CPU 51 displays guidance to that effect on the liquid crystal display 35 and outputs guidance from the speaker 36. The CPU 51 also provides guidance to a parking lot in the vicinity of the destination that has been determined not to be in a congested state and can therefore be used.

Next, the processing at S12 will be explained in greater detail using FIGS. 7 and 8.

In a case where the parking lot 61 is full, as shown in FIG. 7, and the vehicle 62 has been in the aisles within the parking lot 61 for at least the specified time, the probe information that specifies that the parking lot 61 is in a congested state is transmitted from the vehicle 62. Next, the probe center 3 distributes to vehicles 63 to 65, which are located in the vicinity of the parking lot 61, parking lot guidance information to the effect that the parking lot 61 is in a congested state. In a case where the facility 60 is the destination for at least one of the vehicles 63 to 65, the navigation device 1 that is installed in the vehicle uses the liquid crystal display 35 and the speaker 36 to provide guidance to the effect that the destination parking lot is in a congested state. The navigation device 1 also provides guidance for a parking lot 66 that is in the vicinity of the destination and has been determined not to be in a congested state.

Figure 8:
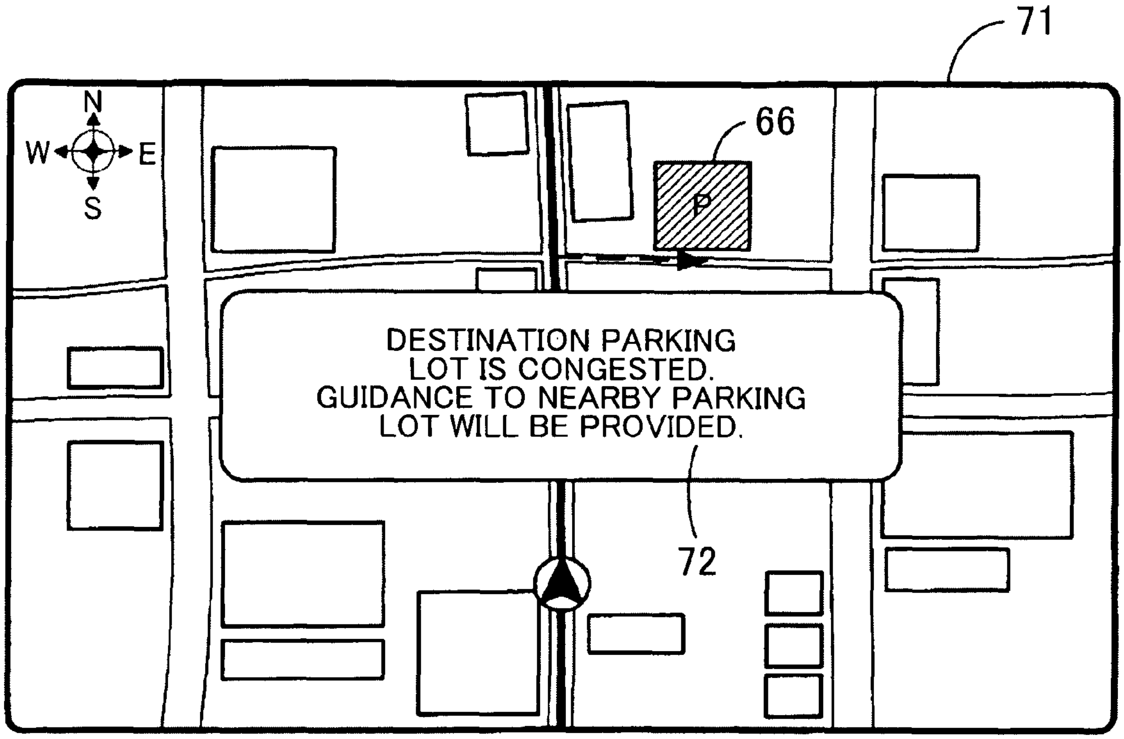
FIG. 8 is a figure that shows a guidance screen that is displayed on the navigation device.

FIG. 8 is a figure that shows a guidance screen 71 that is displayed on the navigation device 1 that is installed in the vehicle for which the facility 60 is set as the destination. As shown in FIG. 8, a guidance text 72 is displayed on the guidance screen 71 that provides guidance to the effect that the parking lot 61 for the destination facility 60 is in a congested state. Guidance is also provided to the parking lot 66 that is in the vicinity of the destination and has been determined not to be in a congested state. The guidance makes it possible for the user to avoid the parking lot 61 that is in a congested state and to park in the parking lot 66 that can currently be used.

Note that the guidance to the effect that the parking lot 61 is congested may also be provided in a vehicle other than the vehicle for which the facility 60 is set as the destination.

As explained in detail above, according to the present embodiment, in a case where it is determined at S4 that the vehicle is in an unparked state within the parking lot for at least the specified time (YES at S4), the navigation device 1, a parking lot congested state determination method used by the navigation device 1, and the computer programs that are executed by the navigation ECU 33 of the navigation device 1 determine that the parking lot where the vehicle is currently located is in a congested state (S5) and transmit to the probe center 3, as the probe information, information that pertains to the parking lot that is determined to be in a congested state. For its part, the probe center 3, based on the received probe information, creates the parking lot guidance information to provide guidance on the parking lots that are currently in a congested state (S113) and distributes the parking lot guidance information that is created to the vehicles that are located in the vicinity of a parking lot that has been determined to be in a congested state (S114). The navigation device 1 in a vehicle to which the parking lot guidance information is distributed provides guidance that pertains to the parking lot that is in a congested state (S12). Therefore, the congested state can be determined by the navigation device 1 even for a small-to-medium-scale parking lot that is not equipped with sensors and infrastructure, and the result of the determination can be shared among vehicles through the probe center 3. This makes it possible to guide the user appropriately to a parking lot that can currently be used.

In addition, because the standards for the determination of the congested state are varied based on the form of the parking lot, the scale and the structure of the parking lot can be taken into account, and the congested state can be determined accurately for each parking lot.

Furthermore, in a case where the vehicle remains within the parking lot for at least the specified time with the ignition switch in the on state, it is determined that the parking lot is in a congested state, so the vehicle can be detected as staying within the parking lot because it is waiting to park, and the congested state of the parking lot can be determined accurately.

In a case where the vehicle remains in the aisles within the parking lot for at least the specified time, the parking lot is determined to be in a congested state, so the vehicle can be detected as remaining in the aisles for a long time because it is waiting to park, and the congested state of the parking lot can be determined accurately.

In a case where the vehicle passes through the same location within the parking lot a plurality of times, the parking lot is determined to be in a congested state, so the vehicle can be detected as driving through the aisles because it is waiting to park, and the congested state of the parking lot can be determined accurately.

Moreover, because the information on the parking lot that is determined to be in a congested state is transmitted to the probe center 3 as the probe information and provided to other vehicles that are searching for parking lots, the other vehicles can avoid the congested parking lot based on the information that is provided, thus making parking more convenient for the other vehicles.

It should be understood by those skilled in the art that the present invention is not limited by the embodiment described above and that various improvements and modifications may occur insofar as they are within the scope of the present invention.

For example, in the present embodiment, the navigation device 1 detects the vehicle as being in an unparked state if it is within the parking lot for at least the specified time, and performs the processing (S4, S5) that determines whether or not the parking lot where the vehicle is located is in a congested state. However, the present invention may also be configured such that the processing is performed by the probe center 3. In that case, the information that pertains to the coordinates of the current position of the vehicle must be transmitted from the vehicle 4 to the probe center 3. Note also that the present invention may be configured such that the processing (S4, S5) is shared by the navigation device 1 and the probe center 3.

With regard to the information pertaining to the parking lot that the navigation device 1 detects and that can be used by the other vehicles, the present invention may also be configured such that the information is provided to the other vehicles by vehicle-to-vehicle communication instead of through the probe center 3.

What is claimed is:

1. A parking lot congested state determination device, comprising:

a vehicle information acquisition unit that acquires vehicle information that pertains to a vehicle;

an unparked state determination unit that determines whether the vehicle is in an unparked state within a parking lot, based on the vehicle information that is acquired by the vehicle information acquisition unit; and a congestion determination unit that, in a case where it is determined by the unparked state determination unit that the vehicle is in an unparked state within the parking lot, determines that the parking lot in which the vehicle is located is in a congested state.

2. The parking lot congested state determination device according to claim 1, wherein the unparked state determination unit, in a case where the vehicle remains within the parking lot for at least a specified time with the ignition switch in the on state, determines that the vehicle is in an unparked state within the parking lot.

3. The parking lot congested state determination device according to claim 2, further comprising:

a parking lot form acquisition unit that acquires the form of the parking lot where the vehicle is located; and a time setting unit that sets the specified time based on the form of the parking lot that is acquired by the parking lot form acquisition unit.

4. The parking lot congested state determination device according to claim 1, wherein the unparked state determination unit, in a case where the vehicle remains in an aisle within the parking lot for at least a specified time, determines that the vehicle is in an unparked state within the parking lot.

5. The parking lot congested state determination device according to claim 4, further comprising:

a parking lot form acquisition unit that acquires the form of the parking lot where the vehicle is located; and a time setting unit that sets the specified time based on the form of the parking lot that is acquired by the parking lot form acquisition unit.

6. The parking lot congested state determination device according to claim 1, wherein the unparked state determination unit, in a case where the vehicle passes through the same location within the parking lot a plurality of times, determines that the vehicle is in an unparked state within the parking lot.

7. The parking lot congested state determination device according to claim 1, further comprising:

a probe information transmission unit that transmits to a probe center, as probe information, information on the parking lot that has been determined to be in a congested state by the congestion determination unit.

8. A parking lot congested state determination method, comprising the steps of:

acquiring vehicle information that pertains to a vehicle;

determining whether the vehicle is in an unparked state within a parking lot, based on the vehicle information that is acquired by the vehicle information acquisition step; and determining, in a case where it is determined that the vehicle is in an unparked state within the parking lot by the unparked state determination step, that the parking lot in which the vehicle is located is in a congested state.

9. A computer-readable medium encoded with a program to cause a processor to function as:

a vehicle information acquisition unit that acquires vehicle information that pertains to a vehicle;

an unparked state determination unit that determines whether the vehicle is in an unparked state within a parking lot, based on the vehicle information that is acquired by the vehicle information acquisition unit; and a congestion determination unit that, in a case where it is determined by the unparked state determination unit that the vehicle is in an unparked state within the parking lot, determines that the parking lot in which the vehicle is located is in a congested state.

* * * * *